Dec. 20, 1927.  
F. N. ROSS  
BUTTON ATTACHING MACHINE  
Filed Oct. 10, 1924  
1,653,065  
11 Sheets-Sheet 8
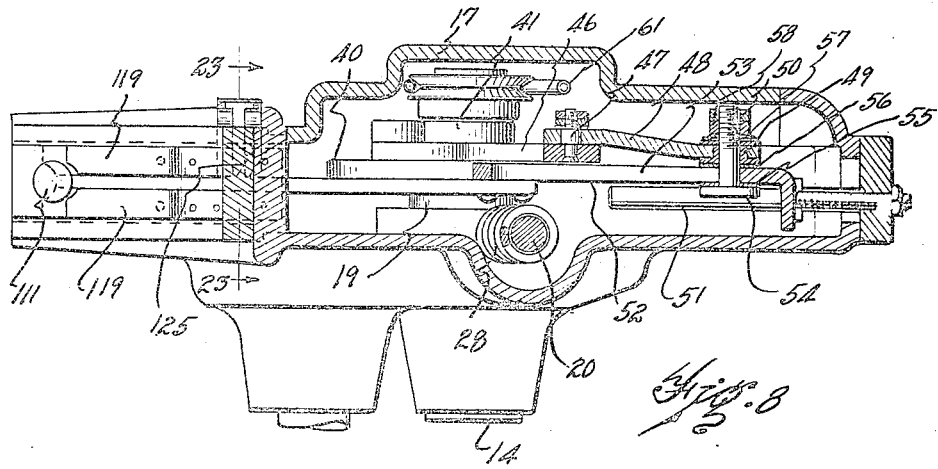
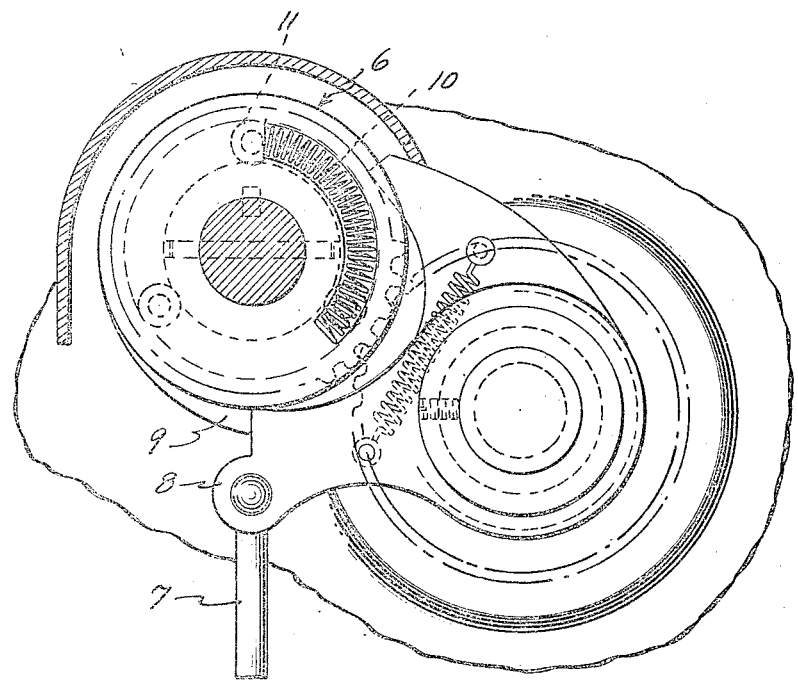
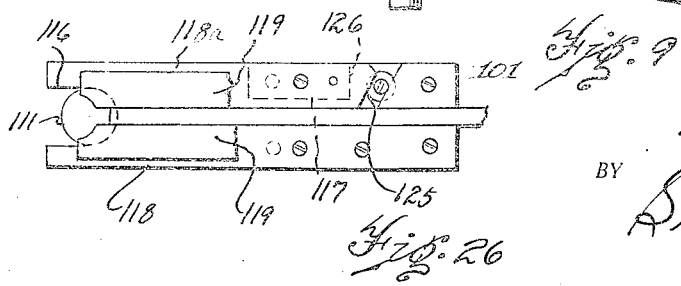
INVENTOR.  
Frederick N. Ross  
BY  
Stuart C. Barnes  
ATTORNEY.

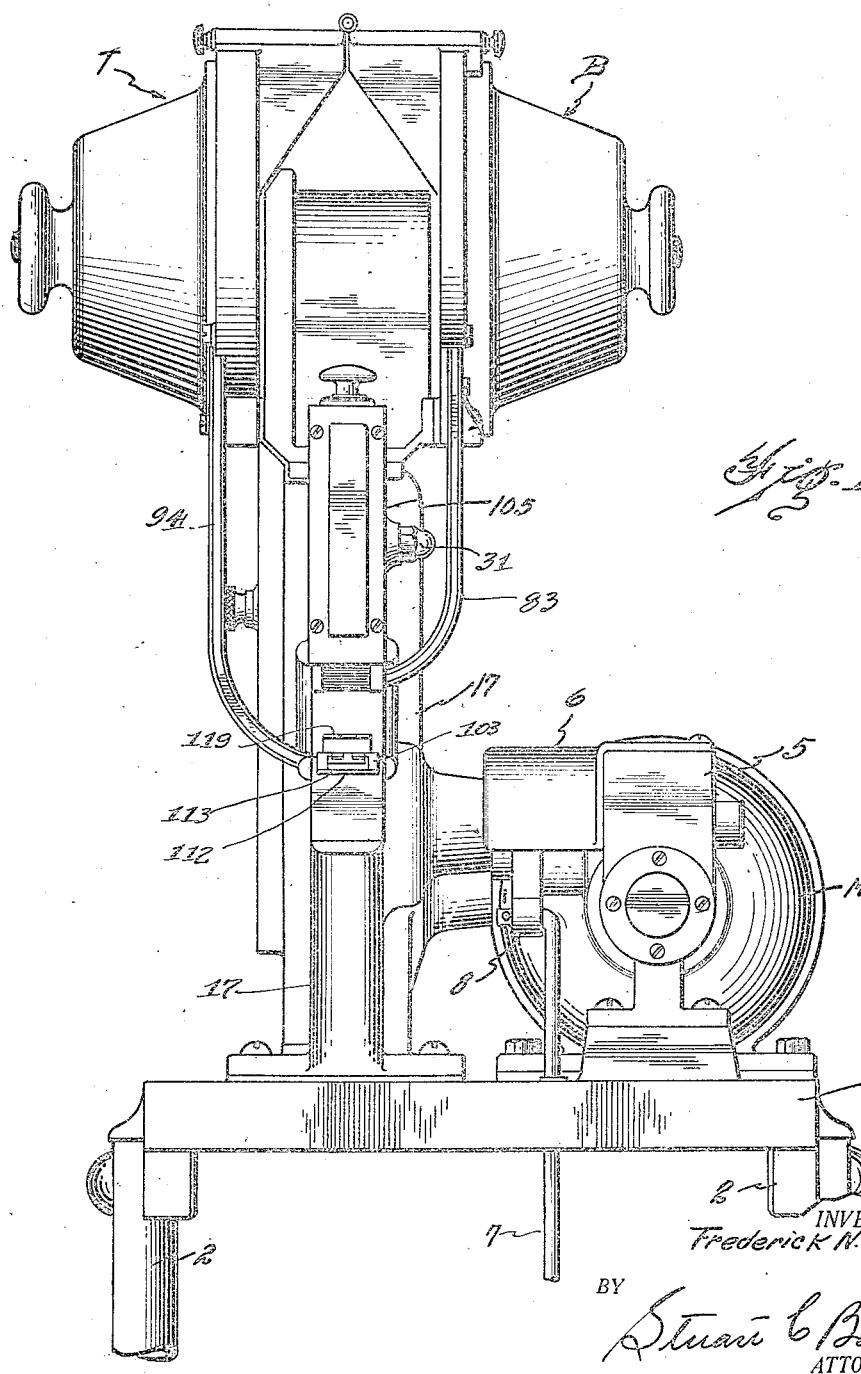

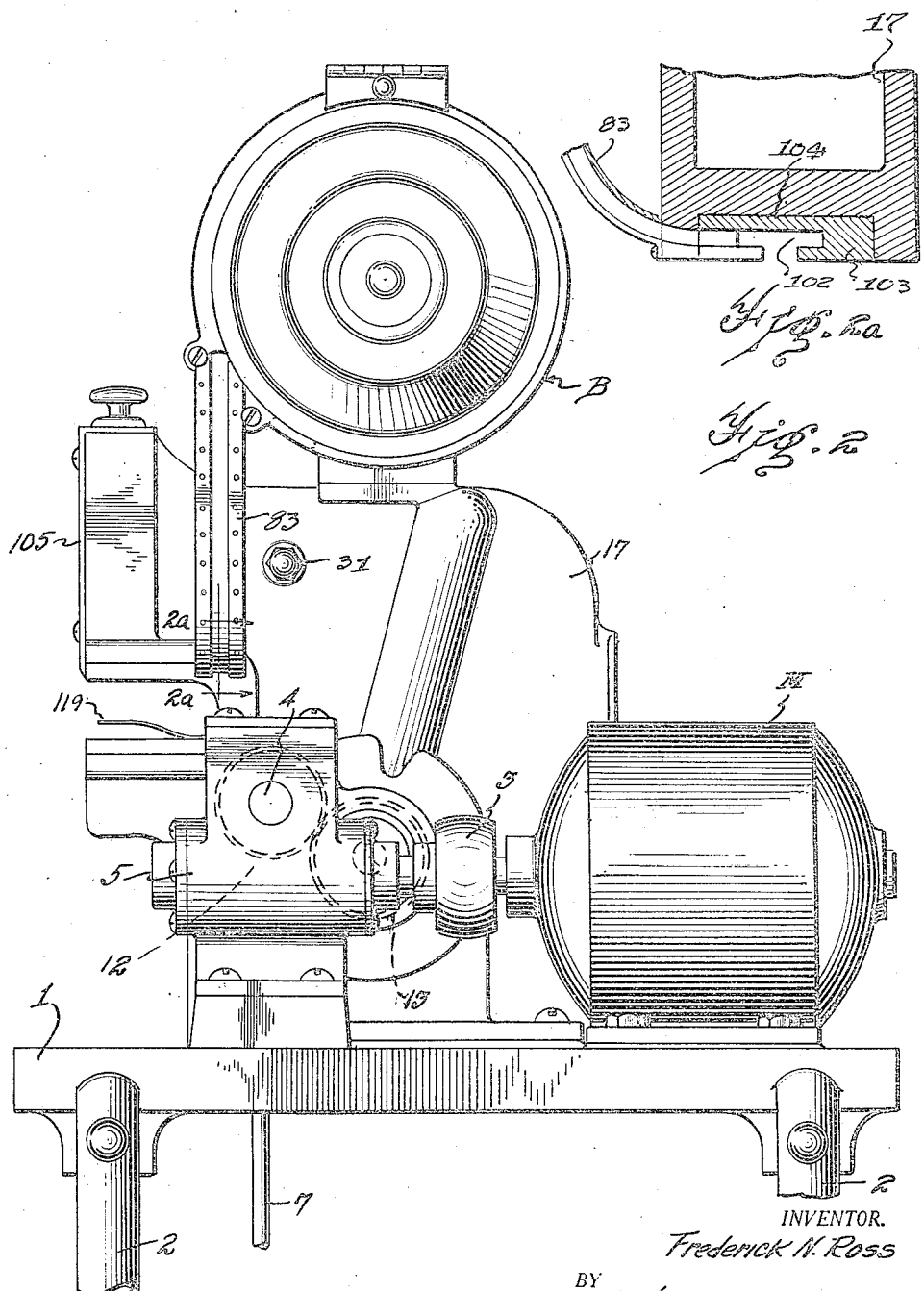

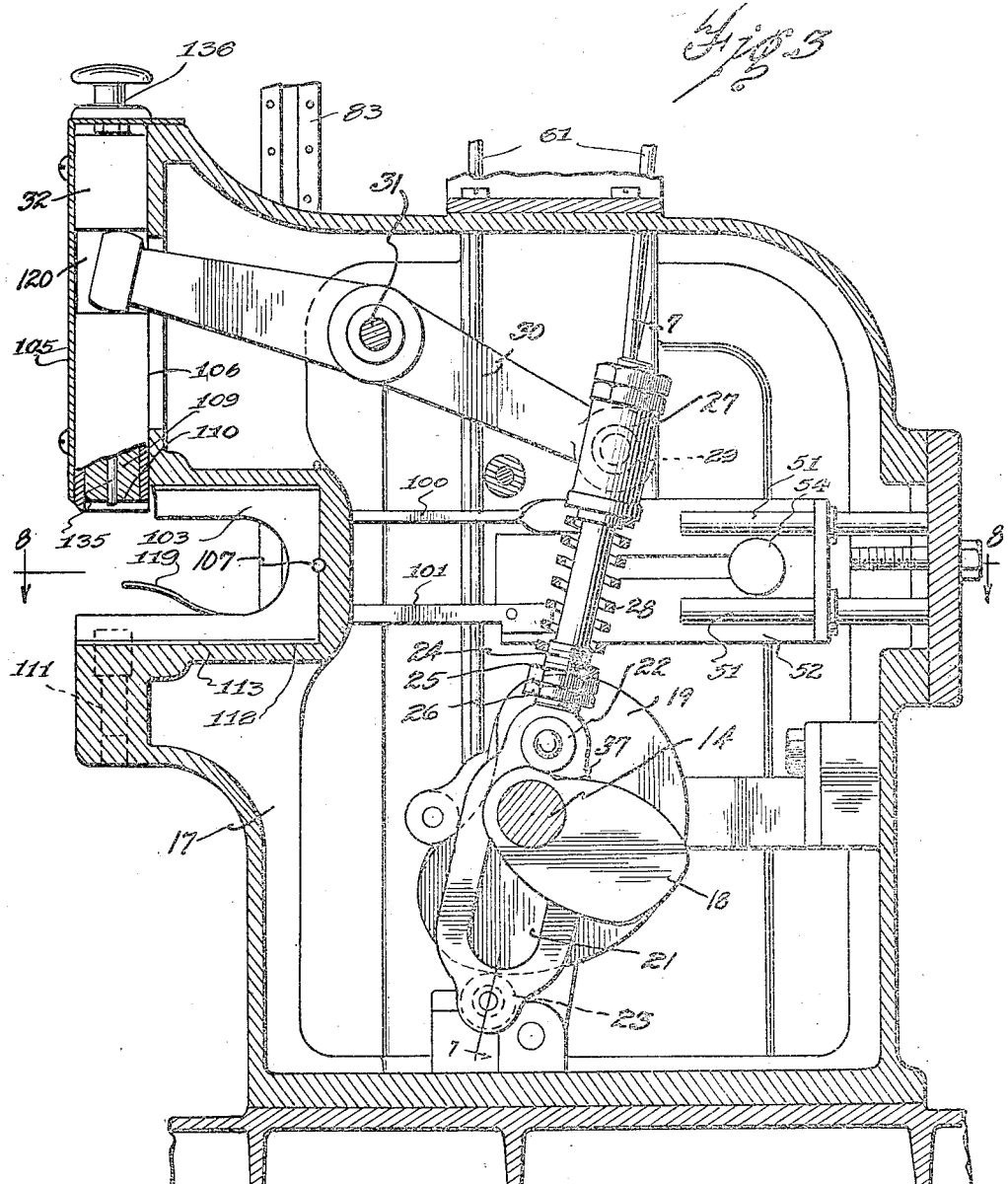

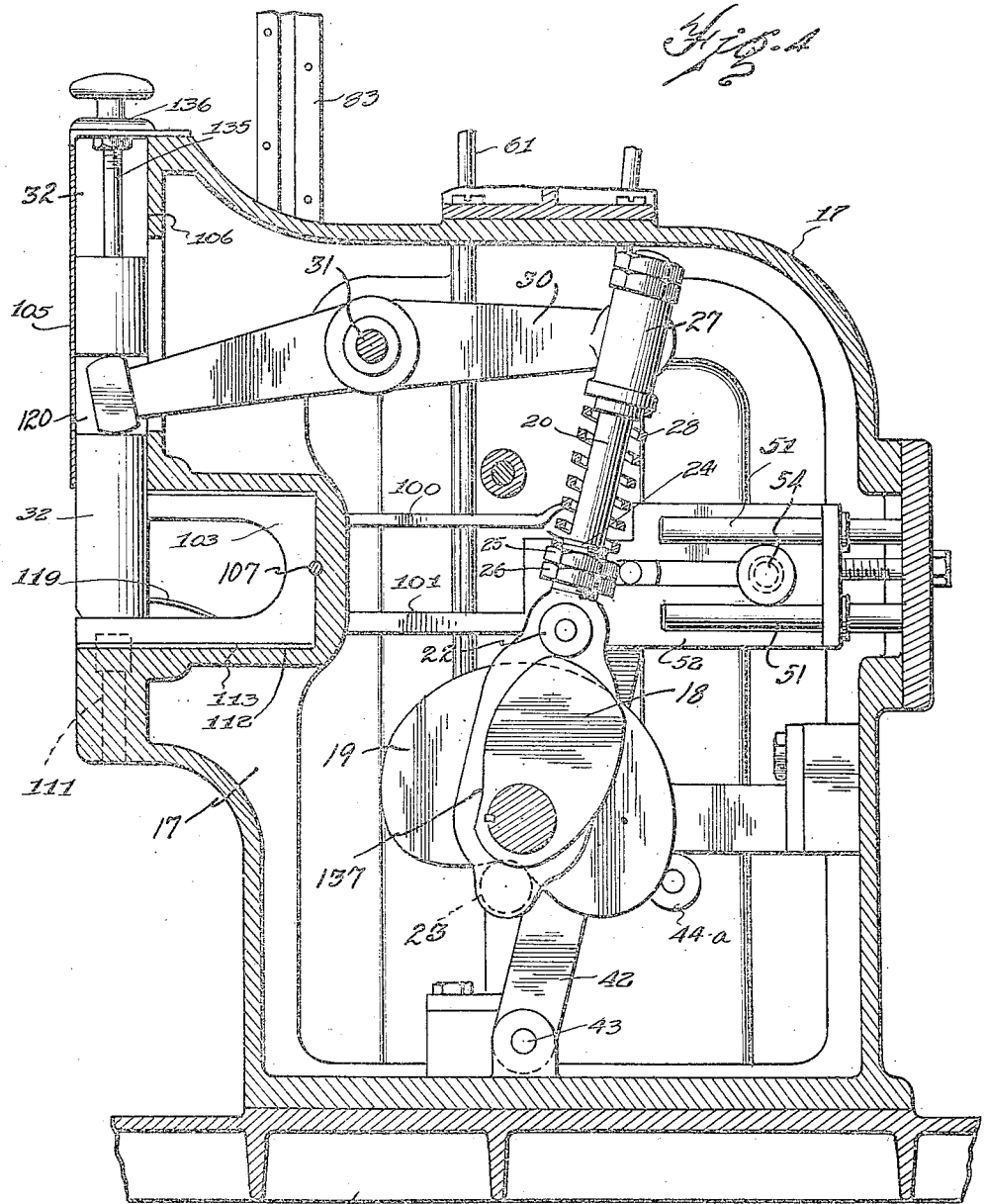

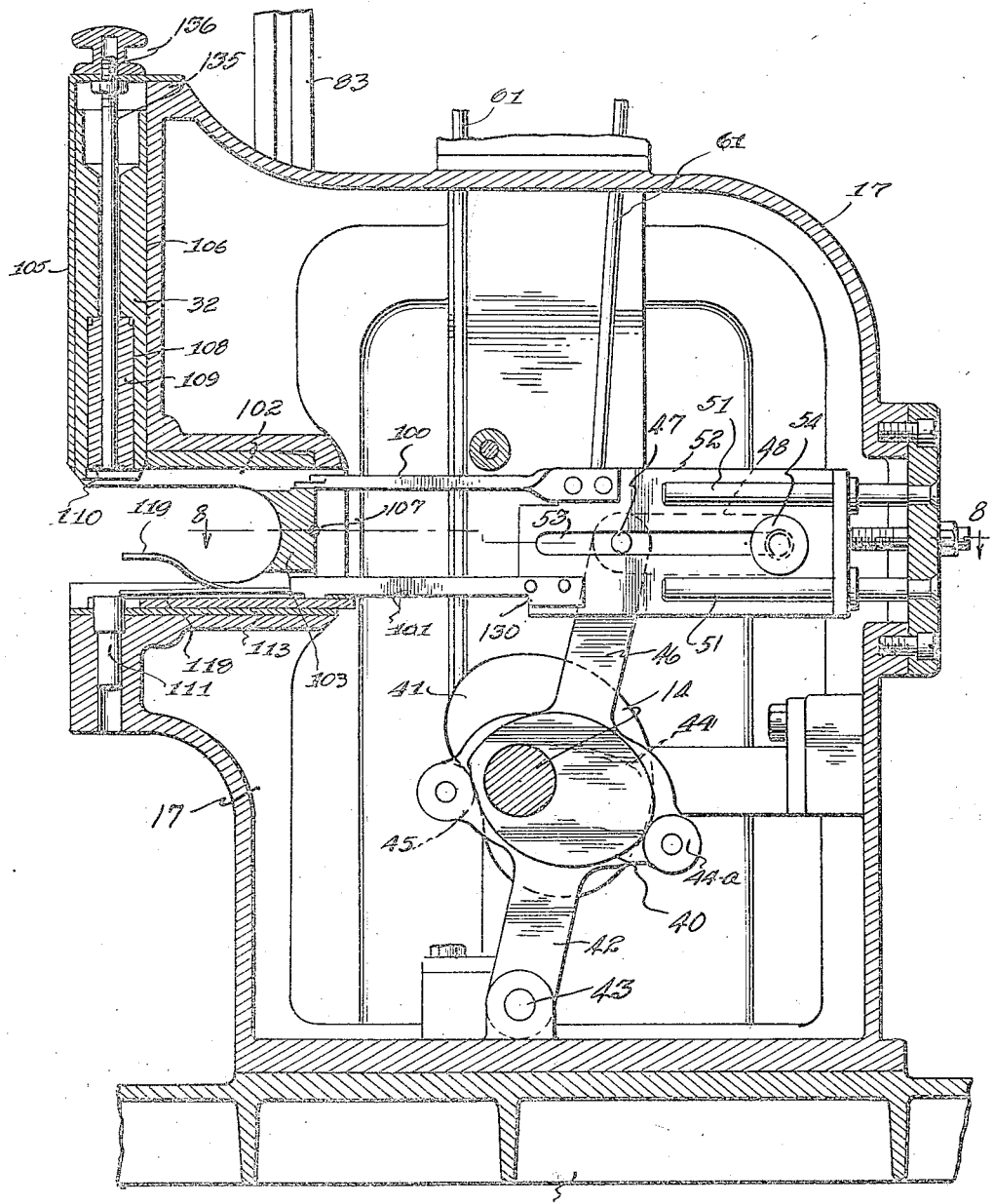

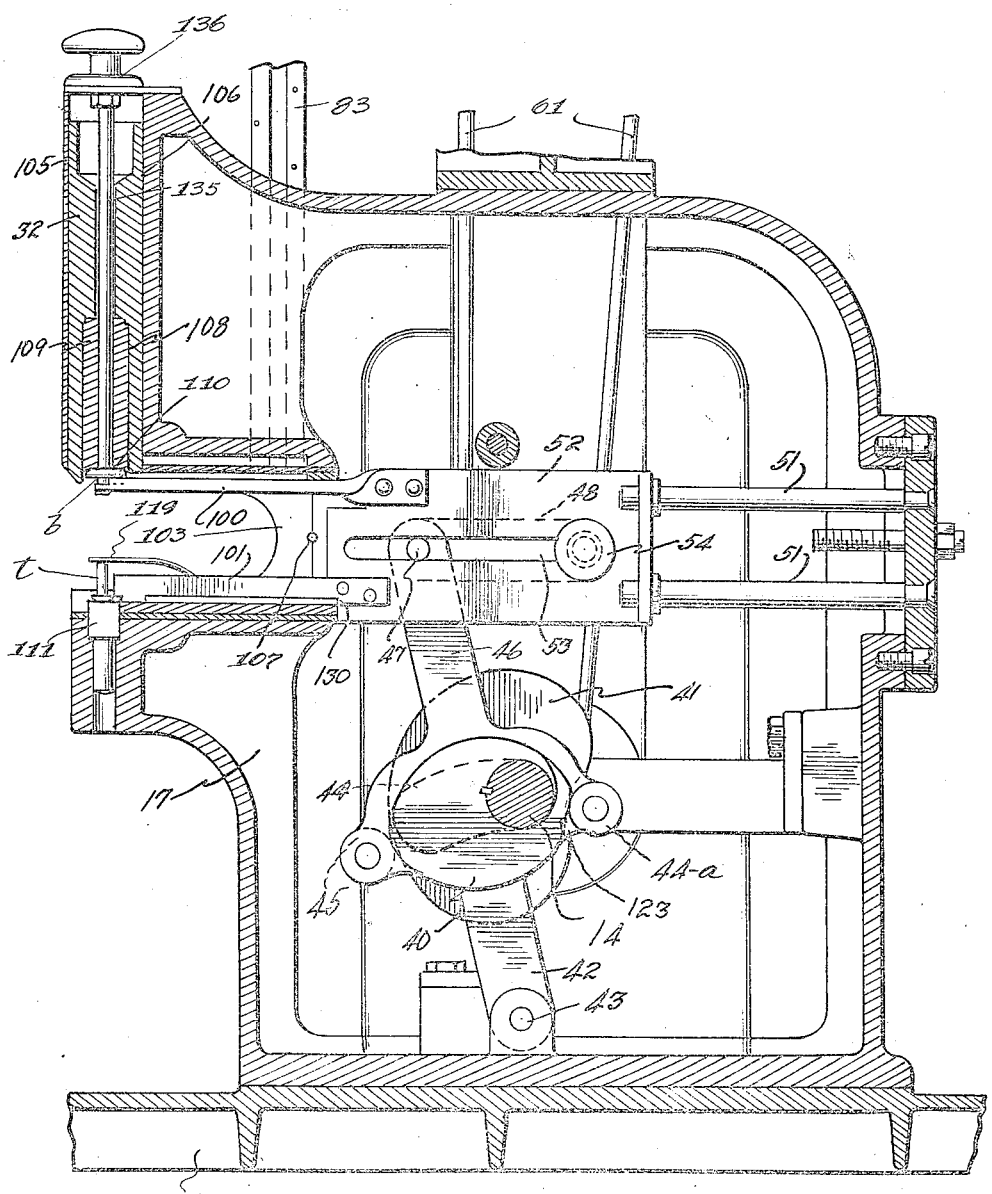

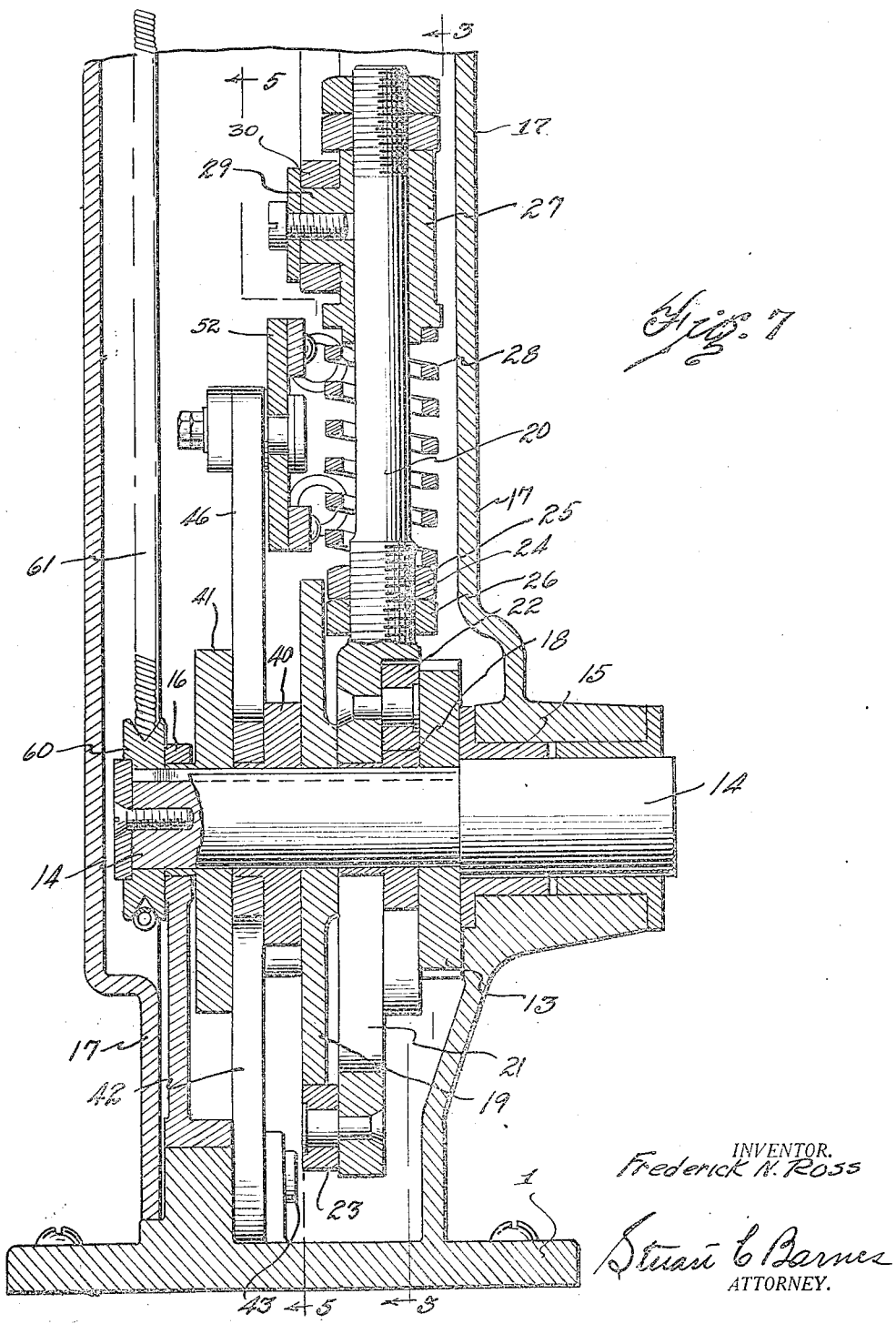

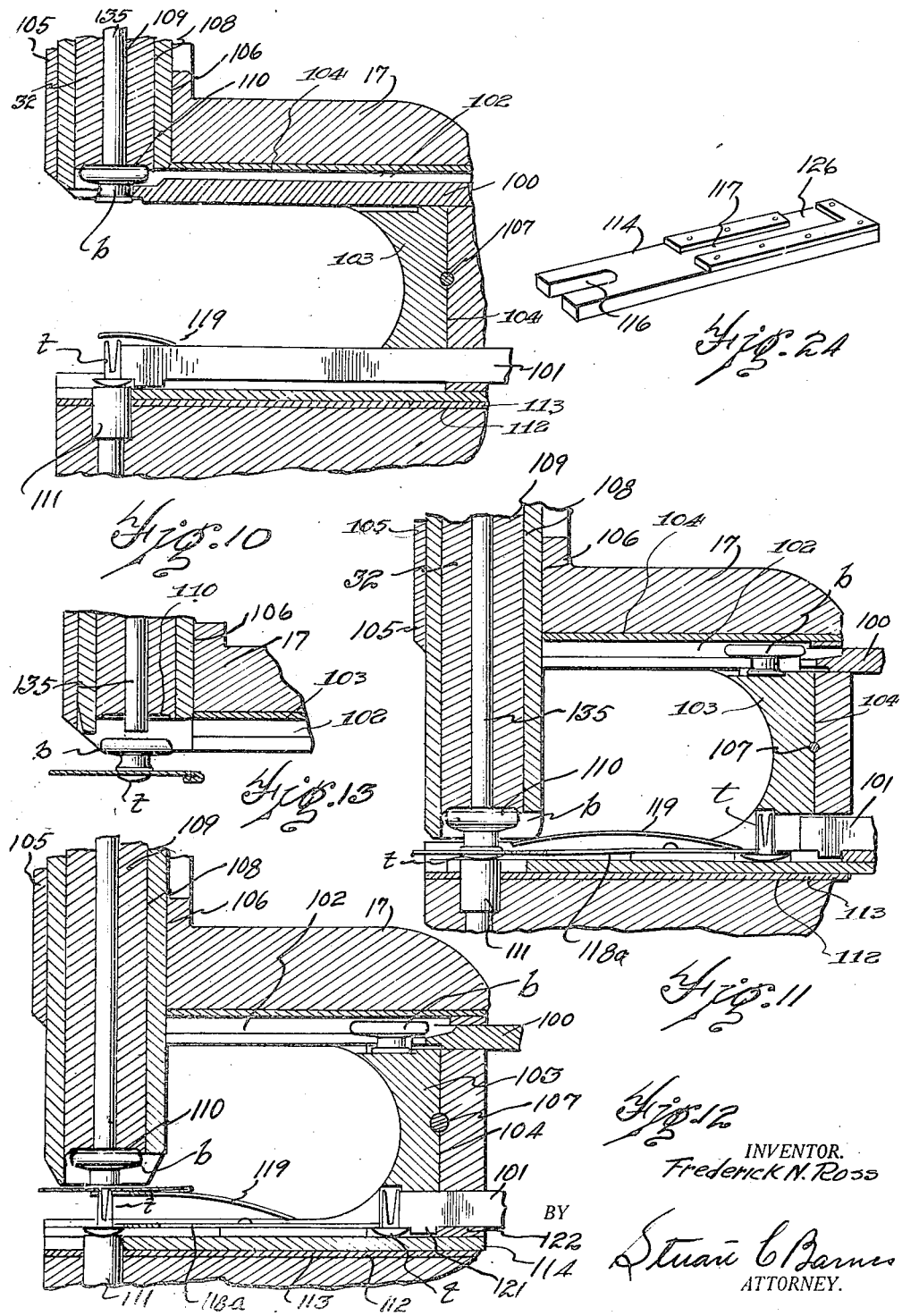

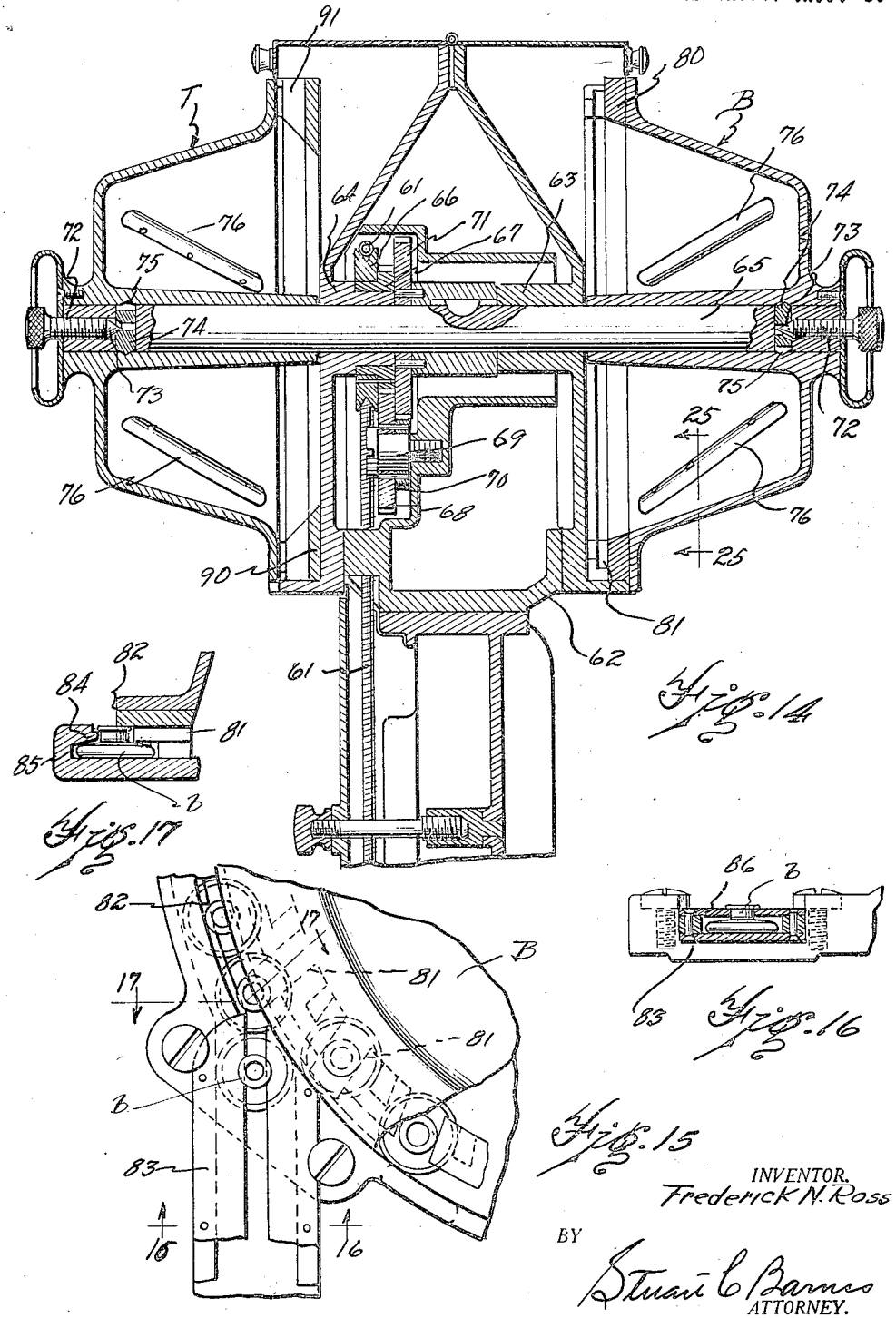

Dec. 20, 1927.
F. N. ROSS
1,653,065
BUTTON ATTACHING MACHINE
Filed Oct. 10, 1924
11 Sheets-Sheet 11
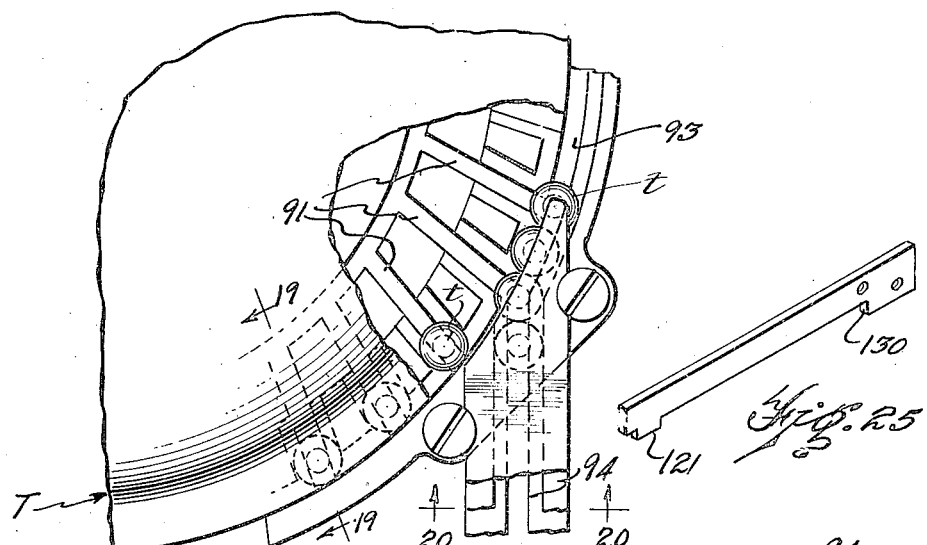
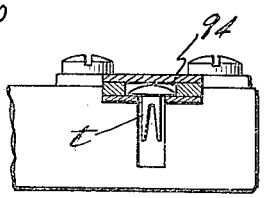
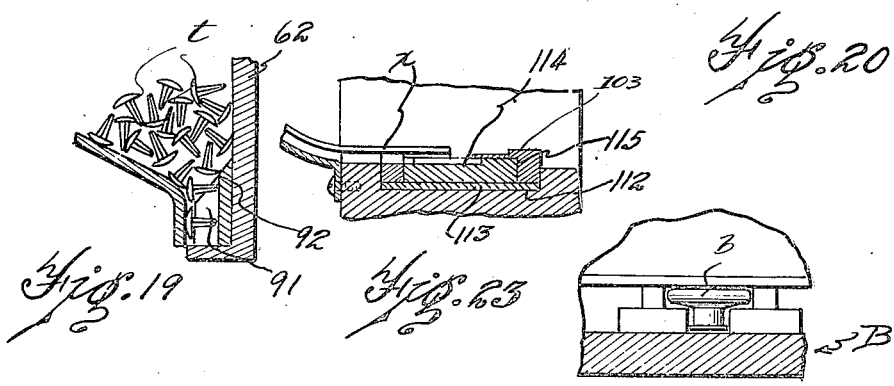
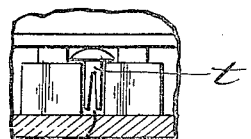
INVENTOR.
Frederick N. Ross
BY
ATTORNEY.

Patented Dec. 20, 1927.

1,653,065

UNITED STATES PATENT OFFICE.

FREDERICK N. ROSS, OF PONTIAC, MICHIGAN, ASSIGNOR, BY MESNE ASSIGNMENTS, TO THE BUTTON ATTACHING MACHINE CO., OF WATERBURY, CONNECTICUT, A CORPORATION OF CONNECTICUT.

BUTTON-ATTACHING MACHINE.

Application filed October 10, 1924. Serial No. 742,786.

This invention relates to a button attaching machine, and more particularly pertains to a machine for attaching a tack button as disclosed in the application of Frederick N. Ross and Ira A. Lethco, Serial No. 678,325 on buttons.

The object of the invention is to provide a machine which will perform the attaching operation in an efficient manner, having as few actuating parts as is necessary. One of the features of the invention is the improved construction of the tack and button guides, and means for feeding the same from the hoppers to the injecting mechanism.

Means are also provided for injecting a tack and button into the tack anvil and the button seat simultaneously with additional means for holding the tack and button on their respective seats during such attaching operation, yet when the tack and button are clinched to the fabric the same may be readily removed.

Another feature is the means by which the button is held upon the seat without the use of fingers, yet not retarding the removal of the button after the clinching operation. A still further object is the means for guiding the tack and for holding the same in correct position on the tack anvil until such time as the button is engaged with the tack, at which time the tack clamps for retaining the same in such position are withdrawn to allow the button to descend to clinch the same onto the fabric.

Another feature is the provision of means whereby a tack and button are positively injected into the sliding tack and button injecting means, and another tack and button is presented at the table at each operation of the machine.

Another feature is the construction of the tack hopper in which the tacks are fed into the tack chute, thereby presenting the tacks to the tack carriage in the position desired without providing a double curve in the tack chute for upsetting the tack. This embodies a new mode of tack feed and a new construction of the tack hopper which turns over the tack before the same is injected into the tack chute.

Another feature is the provision of tack and button filling funnels which are provided with hinged cover plates so constructed that when one cover plate is raised it causes the other cover plate to close so that there is no opportunity for a button to fall into the tack hopper or a tack to fall into the button hopper.

Another feature is the safety device whereby the clinching force is transmitted from the operating cams to the rock arm by a flexible connection so that when a button jams in the clinching head the operating parts of the machine will not be broken but will give sufficiently to prevent such breakage. In addition, the connection between the operating cams and the injecting carriage is such that this connection may slip when a tack or button jams in the injecting slide to prevent breakage of the operating parts, but on the return of the machine to the idling position, the connection between the injecting carriage and the operating cams is automatically adjusted so that the same will be connected together as before.

Another feature of the invention is the driving means for driving the hopper. The hoppers are driven through a belt drive, which allows the operator to easily rotate the button or tack hoppers by hand when it is desired to agitate the contents thereof independently of the operation of the machine. Such an elastic driving connection as I have shown imparts a periodical rotational movement to the hoppers and allows the hoppers to oscillate upon stopping the machine, which tends to more efficiently agitate the contents of the hopper.

Another feature of the machine is the guiding of the button by means of the neck, whereby buttons having heads of different diameters may be fed to the clinching means without requiring a different adjustment or insertion of new or different sized feeding mechanism.

In the drawings:

Fig. 1 is a front elevation of the machine.

Fig. 2 is a side elevation thereof.

Fig. 2ª is a section on the line 2ª—2ª of Fig. 2.

Fig. 3 is a vertical section through the machine showing the plunger operating mechanism taken substantially on the line 3—3 of Fig. 7.

Fig. 4 is a similar sectional view showing the button plunger down.

Fig. 5 is a vertical sectional view showing the means for operating the button and tack injecting carriage taken approximately on the line 5—5 of Fig. 7.

Fig. 6 is a similar view showing the button and tack injecting carriage in its forward position.

Fig. 7 is a vertical sectional view taken on the line 7—7 of Fig. 3.

Fig. 8 is a horizontal sectional view showing the connection between the button and tack injecting carriages and operating means, taken approximately on the line 8—8 of Fig. 5.

Fig. 9 is a detail of the clutch mechanism.

Figs. 10, 11 and 12 are enlarged details of the clinching mechanism and the tack and button injecting means, showing the different steps of the clinching operation.

Fig. 13 is a detail showing the button being ejected.

Fig. 14 is a vertical sectional view through the button and tack hoppers showing the driving means therefor.

Fig. 15 is a detail elevation of a portion of the button hopper.

Fig. 16 is a section on the line 16—16 of Fig. 15, showing the button chute.

Fig. 17 is a section on the line 17—17 of Fig. 15, showing how the button is fed from the hopper into the chute.

Fig. 18 is a detail elevation of a portion of the tack hopper.

Fig. 19 is a section on the line 19—19 of Fig. 18, showing the turning over action of the tacks in the hopper so as to be fed to the chute in the correct position.

Fig. 20 is a section on the line 20—20 of Fig. 18, showing the tack chute.

Fig. 21 is a partial edge elevation of the tack hopper.

Fig. 22 is a partial edge elevation of the button hopper.

Fig. 23 is a detail section taken on the line 23—23 of Fig. 8.

Fig. 24 is a detail in perspective of the tack slide.

Fig. 25 is a detail in perspective of the tack injecting plunger.

Fig. 26 is a detail plan of the spring clamping members for guiding and holding the tack on the anvil and showing the means for injecting the tack in front of the plunger.

This machine comprises a base support 1 and the legs 2, bolted or otherwise secured thereto and the attaching machine is adapted to be secured on this support. A motor M bolted on the support drives through the coupling 3, and drives the shaft 4 through the worm and the worm gear contained within the worm housing 5. The clutch mechanism designated 6 (Fig. 9) may be of any standard construction, though I desire to use in this case a Horton type of clutch. A draft rod 7 connected to a foot pedal (not shown) is connected to the trip 8, which engages the projection 9, carried by one member of the clutch. The driving member of the clutch is adapted to be constantly driven and when the trip releases the projection 9, it allows the spring 10 to function so as to cause relative movement between the driving and driven parts of the clutch, thereby causing the rollers 11 to bind between the two driving and driven members, and thereby connecting up the driven member with the driving member in direct driving relation. As long as the pedal is held depressed the machine will rotate. To stop the machine it is necessary to release the pedal to allow the trip 8 to engage the projection 9 of the driven member, which will cause the spring motor 10 to compress and allow relative movement between the driving and driven members to release the rollers 11 from binding relation therewith, thereby disconnecting the driven member from the driving member. The driven member is connected up to the large gear 12 (Fig. 2) which drives the gear 13, (Fig. 7) keyed or otherwise secured to the shaft 14, supported in bearings 15 and 16, carried by the attaching machine housing 17.

Keyed or otherwise secured to the shaft 14 are a pair of cams 18 and 19, the former being the positive cam and the latter the negative cam. A plunger yoke 20 is provided on its lower end with a slot 21, through which passes the reduced portion of the shaft 14, thereby guiding the plunger yoke. A roller 22 is rotatably supported by this yoke and is adapted to ride on the positive cam 18, while a roller 23, also rotatably supported on the yoke, is adapted to ride against the negative cam 19. These two cams are complementary to each other and as the shaft 14 rotates the rollers 22 and 23 are always in engagement with their respective cams.

Refer to Figs. 3, 4 and 7. As these cams are rotated, it may obviously be seen that the plunger yoke is reciprocated up and down. An intermediate portion of the yoke is threaded as at 24, on which is screwed the collar 25 and the lock nut 26. A trunnion 27 is slidable on the upper reduced end portion of the yoke arm and a compression spring 28 is interposed between the collar 25 and the trunnion. A nut and lock nut are secured on the end of the yoke arm for limiting the upward movement of the trunion. This trunion is provided with a boss 29, for pivotally supporting one end of the plunger rock arm 30, which is in turn pivotally supported to the machine housing 17 as at 31 (see Fig. 3). As the plunger yoke is reciprocated up and down, it will impart a rocking movement to the rock arm, the free end of which engages in the groove 120 of the plunger 32 to reciprocate the same up and down for a purpose later to be described. The spring 28 provides a flexible connection between the rock arm and the positively actuated reciprocating yoke arm. If for any reason the free movement of the rock arm is interfered with the spring 28 will be compressed on the upward movement of the plunger yoke, and prevent any serious damage to the operating parts of the machine.

See Figs. 5, 6 and 7. Secured to the shaft 14 are a pair of injecting cams 40 and 41, the former being the positive cam and the latter the negative cam. A lever or yoke 42 is provided with the segmental slot 44 through which the shaft 14 is passed. Carried by this yoke are the rollers 44ª and 45, the former arranged to ride on the positive injecting cam 40, while the latter roller is arranged to ride on the negative injecting cam 41. This lever has pivotally secured to the free end thereof as at 47, the link 48 (see Fig. 8). The free end of this link is provided with a bushing 49, through which the stud 50 is engaged.

Carried by the machine housing are a pair of guiding pins 51 which slidably support the injecting carriage 52. This injecting carriage is provided with the elongated slot 53, in which the stud 50 is engaged. This stud is provided with an enlarged head 54, and a fibre washer 55 is interposed between the head and the carriage. Another fibre washer 56 is interposed between the flange of the bushing and the carriage. A spring member 57 has one side bearing against the side of the nut 58, and the other side bearing against the bushing for binding the two fibre washers against the side of the injecting carriage.

As the shaft 14 is rotated, the injecting cams keyed thereto are also rotated and cause the carriage yoke or lever, to rock back and forth carrying with it the link 48, imparting a horizontal reciprocating movement to the injecting carriage through the slip connection, as described. If for any reason the injecting carriage meets an obstruction, the stud 50 will slip in the slot 53, thereby preventing any of the operating parts of the machine from becoming broken. In case this connection between the carriage yoke is slipped the same will be slipped back again on the return movement of the carriage and yoke, as the stud 50 will engage the rear end of the slot on its return stroke.

Keyed to the shaft 14 is a pulley wheel 60 (see Fig. 7) about which runs the belt 61. This belt is preferably formed of a close spring coil to provide an elastic driving connection, though it would be possible to use an ordinary non-elastic cable belt, if so desired. This elastic driving connection facilitates the agitation of the hopper contents. When the machine is in use it is being constantly started and stopped and this stopping of the machine which stops the driving shaft 14 rather suddenly, will of course retard the rotation of the hoppers due to the elasticity of the belt; the same may stretch as the hoppers override the machine. This will cause the hoppers to oscillate back and forth and more thoroughly agitate the contents thereof. The belt 61 runs upwardly in the machine housing and is adapted to drive the button and tack hoppers B and T,—see Fig. 14. Secured to the machine housing is the hopper support 62 which is provided with suitable bearings 63 and 64, for rotatably supporting the shaft 65. The pulley wheel 66 is rotatably supported by the hopper support and the belt 61 runs about this pulley wheel and drives the same when the machine is in operation. Pinned or otherwise secured to this pulley wheel is a gear 67, which meshes with the gear 68 supported on the short stud 69, rigidly carried by the hopper support. Pinned to the gear 68 is another gear 70, which meshes with the gear 71, which is keyed or otherwise secured to the shaft 65. It is plainly evident from Fig. 14 that this provides a speed reduction so that the shaft 65 is driven at a much slower speed than the shaft 14. Secured at each end of the shaft 65 is a hopper, one of which is the button hopper B, and the other the tack hopper T.

I provide an easily operated means for quickly and detachably securing these hoppers to the shaft. Screwed into the end of the shaft is a thumb screw 72, provided with a conical end 73, which engages a key 74, transversely and slidably supported in the shaft 65. As the thumb screw 72 is turned in, it will force the key 74 outwardly so that the same may bind in the groove 75 in the hub of each hopper. When the thumb screw is turned as far as it will go, it will bind this key in the groove, and thereby key the button and tack hoppers to the shaft 65, so that the said hoppers may be rotated when the machine is in operation. Secured to the interior of each hopper is a plurality of ribs 76, which will strike against the buttons or tacks which are contained within the hoppers for thoroughly agitating the same when the hoppers are rotated. I preferably form these ribs 76 of leather and rivet the same to the hopper and position the ribs at an angle to the central axis of the hopper. The soft pliable leather ribs render them adaptable to being secured to the hopper in such a position.

On the side of the hopper support which is to support the button hopper, I provide a bearing for rotatably supporting a button ring 80, and the button hopper B is secured to this button ring. I provide a plurality of slots 81 (Figs. 15 and 17) milled through this button ring, said slots having a cross section approximating the cross section of the button which is forced therethrough. This button ring is provided about its periphery with a plurality of these slots so that as the hopper is rotated the buttons will be agitated and caused to slide through the slots 81 into the race-way 82 supported outside of said button ring. The button chute 83 is secured to the hopper support in such a way that the buttons when injected into the raceway are allowed to fall into the button chute and then fall by gravity into position where the same may be injected into the button carriage, later to be described.

The raceway 82 is constructed in such a way (as shown in Fig. 17) that the button is guided by its neck. The raceway is provided with the projecting flanges 84, which are adapted to project under the clinching flange of the button to guide the neck while the passageway 85, in which the button head is supported, is of a greater width than the diameter of the button head so as to allow buttons of different sizes to be guided in the said raceway, as buttons having different size heads may be constructed with necks of the same diameter. Also, as shown in Fig. 16, the button chute 83 is provided with the guide plates 86, which are adapted to engage the button neck for guiding the same as the button falls by gravity down the chute.

At the side of the hopper support, to which is secured the tack hopper T, there is provided a bearing for rotatably supporting the tack ring 90, the tack hopper T being secured to this tack ring. Milled in this tack ring about its periphery is a plurality of T-slots 91, more clearly shown in Fig. 21. These T-slots are arranged so that the tack will fall therethrough with the head out and the prongs in. This tack ring is provided with a beveled inner surface 92 which cooperates with the conical formation of the hopper, as to cause the tacks to crowd into the lowermost point of V, formed by the inclined surfaces of the ring and hopper, thereby tending to keep the tacks away from the stationary hopper support 62, and allowing the ribs 76 secured in the interior of the hopper to agitate the cluster of tacks so that the same will fall through the T slots in the tack ring and enter the raceway 93, secured to the hopper support. A tack chute 94 is secured in such a way that it is in communication with the raceway 93, so that the tacks may fall into the chute and fall by gravity into position where the same may be injected into the tack carriage so that the same may be injected into the clinching mechanism in a manner later to be described.

I have shown how the injecting carriage 52 may be reciprocated back and forth and how the plunger 32 is reciprocated up and down by the cams secured on the rotating shaft 14. Figs. 2ª and 23 show how the buttons and tacks are placed in position to be picked up by the injecting carriage on the operation of the machine (see Figs. 5, 6, 10 to 13 inclusive). Secured to the injecting carriage is a button injecting finger 100 and a tack injecting finger 101. In the position shown in Figs. 5 and 11, these fingers are retracted, the fingers 100 being drawn back so as to allow a button, designated $b$, to be positioned in the button slide 102, which is formed by milling out a slot in the throat insert 103, which is slipped into the recess 104 of the machine housing 17. A cover 105 is secured to the front of the machine housing for enclosing the plunger 32 which is slidable in the groove 106 in said housing. The lower end of this cover extends to a point below the recess 104 in the housing; therefore, after the throat is inserted in said recess the cover 105 may be secured in place, thus preventing the movement of said throat outwardly. The tapered pin 107 (Fig. 12) is driven in from the side of the machine and tends to bind the throat insert within the recess and prevents the displacement of the same.

The plunger 32 is provided with the recess 108 in which is pressed the button anvil or die 109, which has been permanently magnetized. As the machine is set in operation the button injecting finger pushes the button $b$ forward in the button slide until it has pushed it into a position shown by Fig. 10, where the same is seated in the button seat 110, provided in the button anvil. As this button anvil is a permanent magnet it will retain the button on its seat and prevent the same from falling away when the button injecting finger is withdrawn.

During the forward movement of the injecting carriage the tack injecting finger 101 is also pushed forward and carries with it the tack $t$, and forces the same onto the tack anvil 111.

In the machine housing, along the button wall of the recess 104 (Fig. 12) I have milled a groove 112 in which is inserted a plate 113. A slide 114, shown in detail in Figs. 23 and 24, is slidably supported in the runway 115 carried by the throat insert. The forward end of the slide 114 is slotted as at 116 (Fig. 24) the said slot adapted to span the upper end of the tack anvil. The rear end of this slide is thickened and is provided with the groove 117 for guiding the head of the tack. Secured to this thickened portion of the slide are a pair of spring clamps 118 and 118ª, which are extended forwardly from the thickened portion, as shown in Figs. 11 and 12, so that as the tack is pushed forward it leaves the groove 117 which guides the head thereof and is guided between the edges of the clamps 118 and 118ª. The clamps exert a pressure downwardly upon the head of the tack and after the tack has been pushed onto the anvil it will be seen by observing Fig. 26, that these clamps securely hold the tack in place on the anvil and prevent any displacement of the same. A spring guard 119 is also secured to this slide (Fig. 12) and extends outwardly over the tack and is inclined upwardly so that the plane of its outward end is substantially flush with the point of the tack. This guard enables the operator to slip the cloth over the tack without having the cloth catching in the points of the tack.

It is now evident that the button and the tack have both been projected into the button seat and on the tack anvil respectively. The next stage of operation is the lowering of the button plunger and the clinching of the button and tack onto the fabric. This is effected by the plunger rock arm which as described, is rocked up and down. The forward end of the rock arm is engaged in the groove 120 carried by the plunger 132. As this end of the rock arm is forced downwardly, it carries the plunger with it and brings the button into the position approximating that shown in Fig. 12, where the tack prongs have pierced the fabric and are just entering into the button. This is the start of the clinching operation. At this point the projection 121 carried by the tack finger 101, engages the transverse shoulder 122, carried by the slide 114. Due to the construction of the cams, the roller 44ª of the carriage yoke rides upon the low point 123 of the positive cam 40. This causes the finger to be retracted a slight distance, which retracts the slide 114, thereby retracting the clamps 118 and 118ª, also the spring guard 119, so that the clamp and the guard are placed in a non-interfering position with the button. This will allow a further downward movement of the plunger so that the button and tack may be clinched together.

The shoulder 130 (Fig. 25) carried by the tack finger will engage the end of the slide 114 on the forward movement of the injecting carriage and tack finger, so that as the finger approaches the forward position, the shoulder will push against the slide 114 and move the same forwardly until the clamps and guard are again positioned over the tack anvil. This will allow the tack to be injected on the anvil under the clamps so that the tack will be securely held on said anvil while the button is being initially brought into engagement.

Referring to Figs. 8 and 26, it will be seen that during this last mentioned movement of the tack finger, which retracts the clamps, that the clamp 118ª is shorter than the clamp 118, and is provided with a beveled injecting cam 125. The tacks which fall by gravity in the chute will lie in the transverse groove 126 of the slide 114 and abut against the tack finger 101, while the same is in its forward position and when the same is retracted to its fullest extent, it uncovers the mouth of the transverse groove 126. The last final movement of the injecting carriage retracts the clamps with it, thereby causing this beveled injecting cam 125 to engage the shank of the tack and inject the same in front of the tack injecting finger, so that as the finger comes forward again it may push the tack ahead for injecting the same onto the anvil, while the finger holds back the rest of the tacks only allowing one tack to fall in the groove 126 where it will be picked up by the tack injecting finger on the next stroke. In Fig. 23 is shown how the chute is provided with an extension guide $x$, which projects over the slide 114 so as to guide the shank of the tack transversely of the slide as the tack is injected by the beveled cam 125 into the path of the injecting carriage.

An ejector 135 is rigidly secured to the attaching machine housing as at 136, in Fig. 5. This securing means is adjustable so that the ejector may be correctly positioned with respect to the button plunger. The positive plunger cam is provided with a low point 137, see Figs. 3 and 4, so that as the roller 22 engages this low point it will raise the plunger a slight distance above the idling position, the raising of the plunger allowing the ejector rod 135 to be projected a slight distance below the button seat for engaging the button and forcibly ejecting the button from off the seat. This is more clearly shown in Fig. 13, where the ejector is shown projected below the button seat and the button and tack which are clinched to the fabric ejected therefrom.

What I claim is:

1. In a button attaching machine, the combination of means for attaching a tack and button to a piece of fabric, means for feeding the tack and button to said attaching means and including an injecting carriage, fingers carried by said carriage for engaging both the button and tack, means for actuating said carriage, and a yieldable connection between said injecting carriage and said actuating means.

2. In a button attaching machine, the combination of means for attaching a button and tack to a piece of fabric, means for feeding the tack and button to the attaching means and including tack and button guides, an injecting carriage provided with fingers for engaging the button and tack, means for actuating said carriage, whereby the fingers engage the button and tack and inject the same into the attaching means, and a yieldable connection between said injecting carriage and said actuating means.

3. In a button attaching machine, the combination of means for attaching a button and tack to a piece of fabric, an injecting carriage for injecting a tack and button to said attaching means, means for guiding said injecting carriage, means for actuating said carriage, and a yieldable connection between said injecting carriage and said actuating means.

4. In a button attaching machine, the combination of means for attaching a button and tack to a piece of fabric, an injecting carriage provided with a slot, and means for yieldably actuating said injecting carriage and including connections engaging in said slot, whereby the connections may slip in said slot when the injecting carriage meets an obstruction.

5. In a button attaching machine, the combination of means for attaching a tack and button to a piece of fabric, an injecting carriage for injecting a tack or button to the attaching means and provided with a slot, yieldable means for actuating said carriage including connections comprising friction washers engaging the said carriage and a pin guided in said slot, and means for yieldably exerting pressure on one of said washers to provide a yieldable connection between the actuating means and the carriage.

6. In a button attaching machine, the combination of means for attaching a button and tack to a piece of fabric, means for injecting one of said members to said attaching means, a single means presenting a horizontal slot for guiding the neck of said member during the injecting operation and for holding the member in said attaching means, and means for retracting said guiding and holding means during the attaching operation.

7. In a button attaching machine, the combination of means for attaching a button and tack to a piece of fabric, means for injecting one of said members to said attaching means, slidable fingers for both guiding said member during the whole injecting operation and for holding the said member in said attaching means, and means for retracting said fingers during the attaching operation.

8. In a button attaching machine, the combination of means for attaching a tack and button to a piece of fabric, means for feeding a tack and button to said attaching means, slidable spring fingers for both guiding said tack lengthwise of the fingers during the injecting operation and for holding the tack in said attaching means, and means for retracting said spring fingers during the attaching operation.

9. In a button attaching machine, the combination of means for attaching a tack and button to a piece of fabric, means for injecting one of said members to said attaching means, slidable non-spreadable fingers for both guiding said member lengthwise of said fingers during the injecting operation and for holding the member in said attaching means, and means for retracting said fingers during the attaching operation.

10. In a button attaching machine, the combination of means for attaching a tack and button to a piece of fabric and including an anvil, means for injecting one of said members to said attaching means, and a single means disposed lengthwise of the path of travel of the injected member for guiding said member during the injecting operation and for also holding the member on the anvil, and means for retracting said guiding and holding means during the attaching operation.

11. In a button attaching machine, the combination of means for attaching a tack and button to a piece of fabric and including an anvil, means for injecting one of said members to said attaching means, a slidable guide member provided with means disposed lengthwise of the path of injection for guiding the said member during the injecting operation and for also holding the same on the anvil when in a projected position, and means for retracting said guide member and holding means during the attaching operation.

12. In a button attaching machine, the combination of means for attaching a tack and button to a piece of fabric and including an anvil, means for injecting one of said members to said attaching means, a slidable guide plate provided with means for guiding the said member during the whole injecting operation and for also holding the same on the anvil when in a projected position, and means for retracting said guide plate and holding means during the attaching operation.

13. In a button attaching machine, the combination of means for attaching a tack and button to a piece of fabric and including a tack anvil, means for injecting one of said members to said attaching means, a slidable guide plate provided with a guiding groove for guiding the head of said member and provided with additional means for guiding the shank of the member during the injecting operation and for also holding the member on the anvil when in a projected position, and means for retracting said plate and holding means during the attaching operation.

14. In a button attaching machine, the combination of means for attaching a button and tack to a piece of fabric and including an anvil, means for injecting said members to said attaching means, slidable guide plate provided with a guiding groove for guiding the head of the member during a part of said injecting operation, additional means carried by said guide plate for guiding the member during the balance of said injecting operation and for holding the member on the anvil, and means for retracting said guide plate and holding means during the attaching operation.

15. In a button attaching machine, the combination of means for attaching a button and tack to a piece of fabric and including an anvil, means for injecting one of said members to said attaching means, a slidable guide plate for guiding the member during the first part of said injecting operation, yieldable means carried by said guide plate for guiding the member during the balance of said injecting operation and for exerting a downward pressure on the head of the member for holding the member on the anvil, and means for retracting said guide plate and yieldable holding means during the attaching operation.

16. In a button attaching machine, the combination of means for attaching a button and tack to a piece of fabric, means for injecting one of said members into said attaching means, means for guiding said member during the injecting operation and for holding the member in said attaching means, and means carried by the said injecting means for retracting the guiding and holding means during the attaching operation.

17. In a button attaching machine, the combination of means for attaching a button and tack to a piece of fabric and including a tack anvil, means for injecting the tack to said attaching means and including an injecting carriage, means for guiding the tack during the injecting operation and for holding the tack on the tack anvil, and means carried by said injecting carriage for retracting the guiding and holding means during the attaching operation.

18. In a button attaching machine, the combination of means for attaching a tack and button to a piece of fabric and including a tack anvil, means for injecting the tack to said attaching means and including an injecting carriage, a slidable tack guide plate provided with means for guiding the tack during the injecting operation and for yieldably holding the tack on the tack anvil when in a projected position, and means carried by said injecting carriage for engaging the guide plate to retract the guide plate and holding means during the attaching operation.

19. In a button attaching machine, the combination of means for attaching a tack and button to a piece of fabric and including an anvil, means for injecting one of said members into said attaching means and including an injecting carriage provided with a projecting lug, and a slidable guide plate provided with means for guiding the said member during the injecting operation and for yieldably holding the member on the anvil when in a projected position, said guide plate being engaged by the lug carried by the injecting carriage on the reverse movement of said injecting carriage, whereby the guide plate and yieldable holding means are retracted by said injecting carriage during the attaching operation.

20. In a button attaching machine, the combination of means for attaching a tack and button to a piece of fabric, means for injecting one of said members to said attaching means, feeding means, and means carried by said injecting means for detaching one of the members being fed from the feeding means and positively injecting the same to the injecting means.

21. In a button attaching machine, the combination of means for attaching a tack and button to a piece of fabric, means for injecting one of said members into said attaching means, feeding means, and means carried by said injecting means for detaching one of the members being fed from the feeding means and positively injecting the same to the injecting means at a point remote from the said attaching means.

22. In a button attaching machine, the combination of means for attaching a tack and button to a piece of fabric, means for injecting one of said members to said attaching means, feeding means, a slidable guide plate provided with means for guiding the member during the injecting operation, and means carried thereby for detaching a member from the feeding means and delivering the same to the injecting means.

23. In a button attaching machine, the combination of means for attaching a tack and button to a piece of fabric, means for injecting one of said members to said attaching means, feeding means, a slidable guide plate provided with a longitudinal groove for guiding the member during the injecting operation and provided with a transverse groove, and means carried by said sliding plate for detaching said member from the feeding means and delivering the same to the injecting means by causing the member to be forced transversely of said guide plate through said transverse groove.

24. In a button attaching machine, the combination of means for attaching a tack and button to a piece of fabric, means for injecting one of said members into said attaching means, feeding means, a slidable guide plate provided with means for detaching a member from the feeding means and delivering the same to the injecting means, and means for guiding the member transversely of said guide plate.

25. In a button attaching machine, the combination of means for attaching a tack and button to a piece of fabric, means for injecting one of said members into said attaching means, feeding means, a slidable guide plate provided with a sloping injecting cam for engaging the said member, whereby the member is detached from the feeding means and delivered to the injecting means, and means for guiding said member transversely of said guide plate.

26. In a button attaching machine, the combination of means for attaching a tack and button to a piece of fabric, means for injecting one of said members into said attaching means, feeding means, and a slidable guide plate provided with means for detaching said member from the feeding means and delivering the same to the injecting means, said member being delivered to the injecting means during the last part of the rearward movement of said injecting means.

27. In a button attaching machine, the combination of means for attaching a tack and button to a piece of fabric and including a magnetized die provided with a seat for one of said members, means for feeding said member to said attaching means, whereby the magnetized die holds the member on the seat, and means for ejecting the member from the magnetized seat following the attaching operation.

28. In a button attaching machine, the combination of means for attaching a tack and button to a piece of fabric and including a plunger provided with a magnetized die having a seat, means for feeding a button member to the attaching means, whereby the magnetized die holds the member on the seat, and an ejector for disengaging the member from the magnetized seat following the attaching operation.

29. In a button attaching machine, the combination of means for attaching a tack and button to a piece of fabric and including a plunger, a rock arm engaging the plunger, a plunger yoke, means for reciprocating the same, spaced adjusting nuts carried by said yoke, a trunnion slidably supported by the yoke and limited in travel in one direction by one of the nuts, and yieldable means interposed between the trunnion and the other nut for providing a yieldable connection between the trunnion and the yoke.

30. In a button attaching machine, the combination of means for attaching a tack and button to a piece of fabric and including a plunger, a rock arm engaging the plunger, a plunger yoke, means for reciprocating the same, a trunnion slidably supported on the yoke and connected to the rock arm, means adjustably secured on the yoke for limiting the travel of the trunnion in one direction, a spring for resisting the travel of the said trunnion in the other direction to provide a yieldable connection between the trunnion and yoke, and adjustable means for regulating the force of the spring exerted against said trunnion.

31. In a button attaching machine, the combination of two opposed anvils for supporting a button and a tack, each of which is disposed in vertical position, one of which is magnetized and both of which are arranged to be brought together, the magnetized anvil being arranged to hold its fastener without aid from other devices, and means for advancing and positively positioning the fastener directly onto the face of said anvil.

32. In a button attaching machine, the combination of two opposed anvils for supporting a button and a tack, one of which is magnetized and both of which are arranged to be brought together, the magnetized anvil being arranged to hold its fastener without aid from other devices, and a positive injecting and positioning device for feeding the fastener and positioning it directly on the face of the magnetized anvil, and means for retracting this device from the anvil.

33. In a button attaching machine, the combination of two opposed anvils for supporting a button and a tack, one of which is magnetized and both of which are arranged to be brought together, the magnetized anvil being arranged to hold its fastener without aid from other devices, and means for advancing the fastener and positioning it directly onto the magnetized anvil by a lateral movement across the face of the anvil, said means retracting from the anvil after the work has been fed.

34. In a button attaching machine, the combination of a pair of cooperating anvils for securing two button parts together, a depressible spring guard overlying one of the anvils for guiding the work over said anvil and the button part supported thereby, and means for retracting the spring guard when the two anvils come together for securing the button parts together.

35. In a button attaching machine, the combination of a pair of cooperating anvils for securing two button parts together, a spring guard overlying one of the anvils for guiding the work over said anvil and the button supported thereby, said spring guard being laterally movable whereby it may be retracted from over the anvil when the two anvils come together.

36. In a button attaching machine, a pair of cooperating anvils for securing two button parts together, retaining fingers for holding one button part on one of the anvils a guard disposed over one of the anvils for guiding the work over the same, and means for retracting both the retaining fingers and the guard when the two anvils come together.

37. In a button attaching machine, a pair of cooperating anvils for securing two button parts together, spring retaining fingers for holding one button part on one of the anvils, a spring guard disposed over one of the anvils for guiding the work over the same, and means for retracting both the spring retaining fingers and the spring guard when the two anvils come together.

In testimony whereof I have affixed my signature.

FREDERICK N. ROSS.